(12) United States Patent
Colucci et al.

(10) Patent No.: US 7,959,307 B1
(45) Date of Patent: Jun. 14, 2011

(54) OPTICAL PROJECTION SYSTEM AND METHOD OF USE

(75) Inventors: D'nardo Colucci, Milwaukee, WI (US); David M. McConville, Asheville, NC (US); Clayton C. Hooker, Marshall, NC (US)

(73) Assignee: The Elumenati, LLC, Milwaukee, WI (US)

( * ) Notice: Subject to any disclaimer, the term of this patent is extended or adjusted under 35 U.S.C. 154(b) by 0 days.

(21) Appl. No.: 12/624,299

(22) Filed: Nov. 23, 2009

Related U.S. Application Data

(63) Continuation of application No. 11/474,015, filed on Jun. 23, 2006, now Pat. No. 7,621,647.

(51) Int. Cl.
G03B 21/00 (2006.01)
G03B 21/14 (2006.01)
G09B 23/00 (2006.01)
G09B 27/02 (2006.01)
G09B 27/06 (2006.01)

(52) U.S. Cl. ............ 353/121; 353/69; 353/70; 353/122; 434/284; 434/287; 434/293

(58) Field of Classification Search ............ 353/30, 353/69–70, 77, 79, 121–122; 434/284–296; 359/435, 451, 641, 664, 708, 713–717
See application file for complete search history.

(56) References Cited

U.S. PATENT DOCUMENTS

| | | | |
|---|---|---|---|
| 3,469,837 A * | 9/1969 | Heilig | 472/60 |
| 3,720,455 A | 3/1973 | Sahlin | |
| 3,742,658 A | 7/1973 | Meyer | |
| 3,934,259 A | 1/1976 | Krider | |
| 3,953,111 A * | 4/1976 | Fisher et al. | 359/714 |
| 3,998,522 A | 12/1976 | Holzel | |
| 4,022,522 A | 5/1977 | Rain | |
| 4,070,098 A | 1/1978 | Buchroeder | |
| 4,288,947 A | 9/1981 | Huang | |
| 4,473,355 A | 9/1984 | Pongratz | |
| 4,807,405 A | 2/1989 | Borgquist | |
| 5,469,669 A | 11/1995 | Alter | |
| 5,579,609 A | 12/1996 | Sallee | |

(Continued)

FOREIGN PATENT DOCUMENTS

WO    WO-9838599    9/1998

(Continued)

OTHER PUBLICATIONS

"U.S. Appl. No. 11/474,015, Examiner Interview Summary filed Sep. 14, 2009", 2 pgs.

(Continued)

*Primary Examiner* — Tony Ko
*Assistant Examiner* — Jori S Reilly-Diakun
(74) *Attorney, Agent, or Firm* — Schwegman, Lundberg & Woessner, P.A.

(57) ABSTRACT

Embodiments include a light engine to generate pixels and a number of lenses positioned to receive pixels from the light engine and to project the pixels on to a field with a higher angular pixel density at an edge of the field than at a center of the field. A method according to embodiments includes generating pixels in a light engine, receiving the pixels from the light engine in a plurality of lenses, and projecting the pixels through the plurality of lenses on to a field with a higher angular pixel density at an edge of the field than at a center of the field.

20 Claims, 7 Drawing Sheets

U.S. PATENT DOCUMENTS

| | | | |
|---|---|---|---|
| 5,610,765 | A | 3/1997 | Colucci |
| 5,724,775 | A | 3/1998 | Zobel, Jr. et al. |
| 5,762,413 | A | 6/1998 | Colucci et al. |
| D396,115 | S | 7/1998 | Zobel, Jr. |
| 5,777,795 | A | 7/1998 | Colucci |
| 6,022,172 | A | 2/2000 | Siyaj |
| 6,034,717 | A * | 3/2000 | Dentinger et al. ............. 348/51 |
| 6,061,969 | A | 5/2000 | Leary |
| 6,104,405 | A | 8/2000 | Idaszak et al. |
| 6,128,130 | A | 10/2000 | Zobel, Jr. et al. |
| 6,128,145 | A | 10/2000 | Nagaoka |
| D436,469 | S | 1/2001 | Idaszak et al. |
| D440,794 | S | 4/2001 | Zobel, Jr. et al. |
| 6,231,189 | B1 | 5/2001 | Colucci et al. |
| 6,252,603 | B1 | 6/2001 | Oxaal |
| 6,271,853 | B1 | 8/2001 | Oxaal |
| 6,323,862 | B1 | 11/2001 | Oxaal |
| 6,346,967 | B1 | 2/2002 | Gullichsen et al. |
| 6,409,351 | B1 | 6/2002 | Ligon |
| 6,530,667 | B1 | 3/2003 | Idaszak |
| 6,573,894 | B1 | 6/2003 | Idaszak et al. |
| 6,712,477 | B2 | 3/2004 | Idaszak et al. |
| 6,717,610 | B1 | 4/2004 | Bos et al. |
| 6,733,136 | B2 | 5/2004 | Lantz et al. |
| D495,306 | S | 8/2004 | Fletcher et al. |
| 6,844,990 | B2 * | 1/2005 | Artonne et al. ............... 359/725 |
| 6,871,961 | B2 | 3/2005 | Balu et al. |
| 6,880,939 | B2 | 4/2005 | Colucci et al. |
| 6,909,543 | B2 | 6/2005 | Lantz |
| 7,004,588 | B2 | 2/2006 | Sadler |
| 7,021,937 | B2 | 4/2006 | Simpson et al. |
| 7,131,733 | B2 | 11/2006 | Shibano |
| 7,173,776 | B2 | 2/2007 | Tada et al. |
| 7,293,881 | B2 | 11/2007 | Kasahara |
| 7,412,091 | B2 | 8/2008 | Hack |
| 7,420,177 | B2 | 9/2008 | Williams et al. |
| 7,621,647 | B1 | 11/2009 | Colucci et al. |
| 2002/0009699 | A1 | 1/2002 | Hyodo et al. |
| 2002/0141053 | A1 | 10/2002 | Colucci et al. |
| 2004/0227703 | A1 | 11/2004 | Lamvik et al. |
| 2005/0206857 | A1 | 9/2005 | Yamada |
| 2005/0259158 | A1 | 11/2005 | Jacob et al. |
| 2007/0097331 | A1 | 5/2007 | Sadler et al. |

FOREIGN PATENT DOCUMENTS

| | | |
|---|---|---|
| WO | WO-2005019837 | 3/2005 |
| WO | WO-2007110097 A1 | 10/2007 |

OTHER PUBLICATIONS

"U.S. Appl. No. 11/474,015, Examiner Interview Summary mailed May 29, 2009", 1 pg.

"U.S. Appl. No. 11/474,015, Non-Final Office Action mailed Feb. 27, 2009", 25 pgs.

"U.S. Appl. No. 11/474,015, Notice of Allowance mailed Aug. 14, 2009", 3 pgs.

"U.S. Appl. No. 11/474,015, Response filed May 27, 2009 to Non Final Office Action mailed Feb. 27, 2009", 14 pgs.

"Stargazer Planetariums—Negative Pressure Domes", 1 pg.

Laikin, M., "Chapter 9—Very Wide Angle", *In: Lens Design*, Marcel Dekker, New York, NY 10016, (1991), p. 85.

Sterling, R D, et al., "Electronic Cinema using ILA Projector Technology", *SID Symposium Digest of Technical Papers*—May 1999—vol. 30, Issue 1, pp. 216-219, (May 1999), 4 pgs.

* cited by examiner

OPTICAL PROJECTION SYSTEM AND METHOD OF USE

RELATED APPLICATIONS

This Application is a Continuation of U.S. application Ser. No. 11/474,015, filed on Jun. 23, 2006, which is incorporated herein by reference.

TECHNICAL FIELD

This application relates generally to optical projection systems.

BACKGROUND

Fisheye projection of moving images into dome theaters is a well established field dating back to the Atmospherium, a fulldome projection system designed at the University of Nevada-Reno in 1960. These early systems used film with images captured using a fisheye capture lens and were the precursors to OmniMax theaters that dominated the field for over 25 years. Projection systems are discussed in U.S. Pat. Nos. 3,934,259, 3,953,111 and 4,070,098. In the late 1990s, it became possible to use digital projectors rather than film. With that came the ability to project real-time imagery as well a linear (movie) playback.

Milton Laikin, in Lens Design 85 (Marcel Dekker, Inc. 1991), observed that fisheye lenses tend toward an equal angular pixel distribution or a linear relationship between field angle and image height known as a f-theta or f-θ in the field of optical design. Such systems are discussed in U.S. Pat. No. 5,762,413. As graphics hardware has progressed exact adherence to f-θ has become less important. Graphics hardware is capable of real time correction of arbitrary distortions.

There is a need for improved projection systems and methods to take advantage of modern graphics hardware.

DETAILED DESCRIPTION

Figure 1:
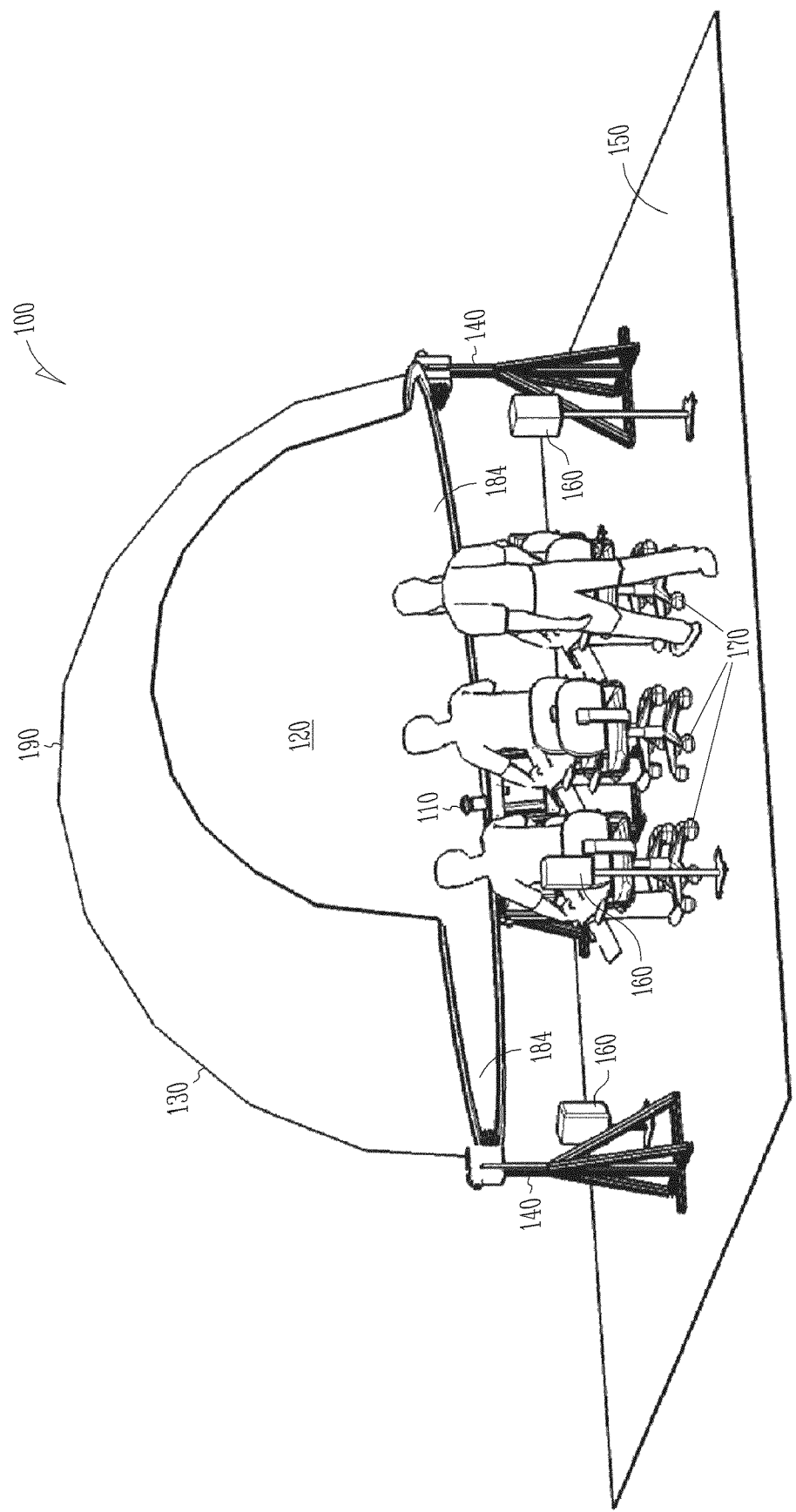
FIG. 1 illustrates a dome theater including a projection system according to various embodiments.

In the following detailed description of various embodiments, reference is made to the accompanying drawings that form a part hereof, and in which are shown by way of illustration, and not of limitation, specific embodiments in which the subject matter may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that compositional, structural, and logical substitutions and changes may be made without departing from the scope of this disclosure. The following detailed description, therefore, is not to be taken in a limiting sense. Examples and embodiments merely typify possible variations. Individual components and functions are optional unless explicitly required, and the sequence of operations may vary. Portions and features of some embodiments may be included in or substituted for those of others. The following description is, therefore, not to be taken in a limiting sense.

All fisheye lenses tend toward f-θ distortion. This means that as one moves linearly away from the optical axis in image space, one moves linearly, in angle, away from the optical axis in object space. Some projectors use a regular array of pixels. When coupled with a traditional f-θ fisheye lens, this leads to an equal angular pixel distribution. This distribution is less than optimal in many dome theater arrangements.

In a planetarium, for example, the majority of audience attention is within 45 degrees of the event horizon. A better lens design would place more pixels in this region and fewer in the region from 45° to 0° (the zenith). Various embodiments described herein improve the projected pixel distribution with a type of fisheye lens called !theta where the meaning of ! is taken from set theory where ! is defined as "not."

FIG. 1 illustrates a dome theater 100 including a projection system 110 according to various embodiments. The projection system 110 includes a !theta lens and a light engine to project images or arrays of pixels onto an interior surface 120 of a dome 130. The interior surface 120 is a truncated spherical surface. According to various embodiments, the interior surface 120 is a truncated sphere having a sweep angle of less than 180 degrees.

A truncated sphere is any surface that has a sweep angle of less than 360 degrees and is truncated by at least one plane. The interior surface 120 shown in FIG. 1 is a truncated sphere that is truncated by two planes.

The dome 130 rests on supports 140 which, in turn, rest on a surface 150. The dome theater 100 includes a sound system with speakers 160 for projecting voice and music into space under the dome 130. The dome theater 100 includes seats 170 for spectators to sit in while perceiving the images, voice, and/or music. The center of focus for the spectators is near the event horizon 184, not the zenith 190, of the dome 130. The projection system 100 may be used to project images onto surfaces other than domes according to various embodiments.

In an alternate embodiment, the projection system 110 is mounted at a center of the dome 130 to radially project images or arrays of pixels onto the interior surface 120. In an alternate embodiment, the projection system 110 includes a mechanism to tilt itself to project the images or arrays of pixels onto different selected positions on the interior surface 120. For example, the projection system 110 may be pivotally mounted on a base using a pivot (not shown). The pivot may allow pivoting within a plane or in multiple planes. In an alternate embodiment, the projection system 110 is located a distance from the geometric center of the interior surface 120.

Figure 2:
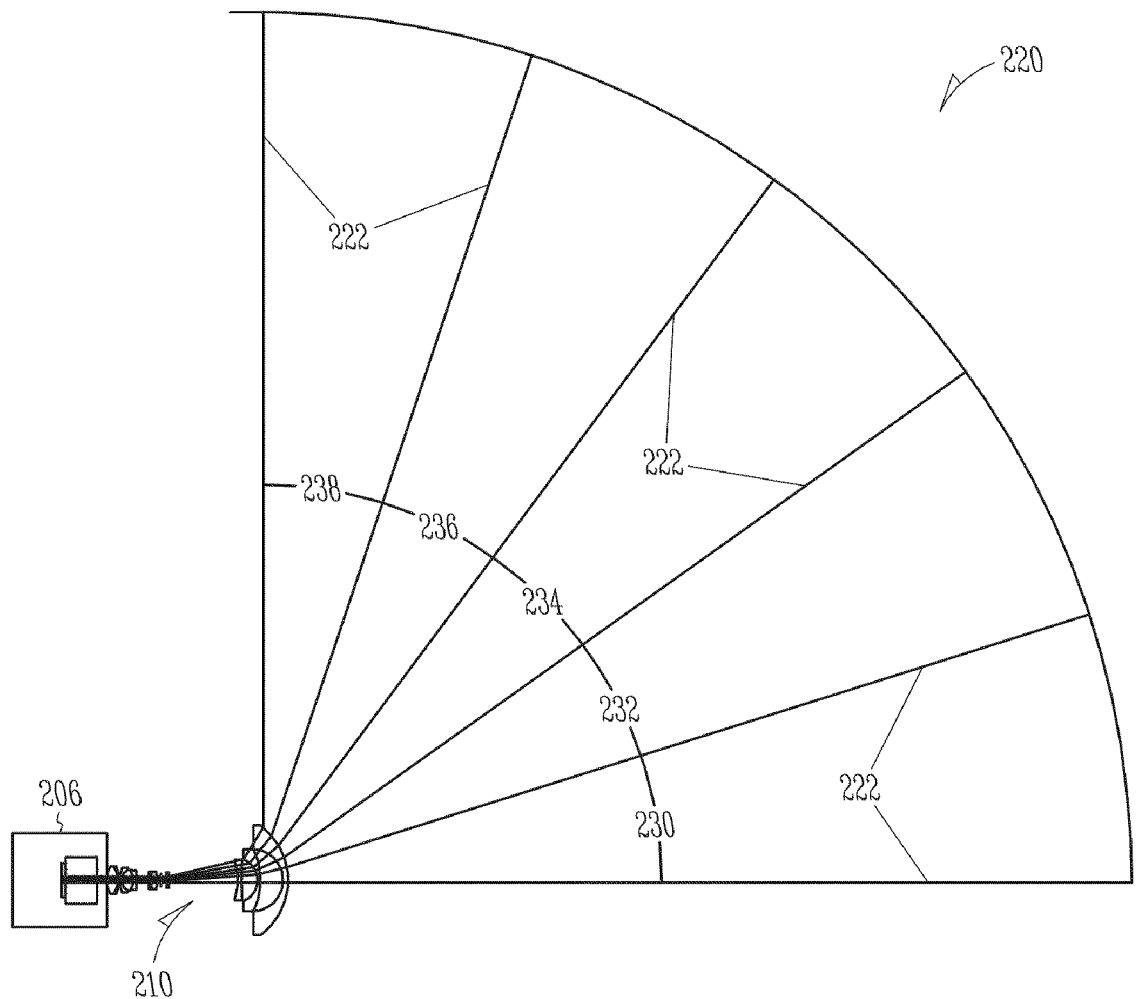
FIG. 2 illustrates specific field points projected from a !theta lens and a light engine with an unequal angular distribution according to various embodiments.

FIG. 2 illustrates specific field points 220 projected from a !theta lens 210 and a light engine 206 with an unequal angular distribution according to various embodiments. The !theta projection system generating the field points shown in FIG. 2 is suitable for a dome theater application. Six ray bundles 222 represent light projected from pixels that are on-axis, 0.2, 0.4 . . . 1.0 away from a center of a normalized image. In object space, each bundle 222 is projected a certain angle, 230, 232, 234, 236, 238, away from its neighbor. A 180° fisheye lens with an f-θ distribution projects rays with a constant angular separation resulting in projection angles of 0°, 18°, 36° . . . 90°, respectively. A !theta lens according to various embodiments has a different distribution of the bundles 222 such that the angles 230-238 between the bundles 222 gradually decrease. The angle 230 is greater than the angle 232, which in turn is greater than the angle 234, and so on. This distribution is represented mathematically as the angles 230>232>234>236>238 where ">" indicates "greater than." The !theta projection system according to various embodiments provides a projected field of view of 135 degrees or more with a non-linear image distortion characteristic that departs from the normal linear, or f-θ, distortion of an f-θ fisheye lens.

Figure 3:
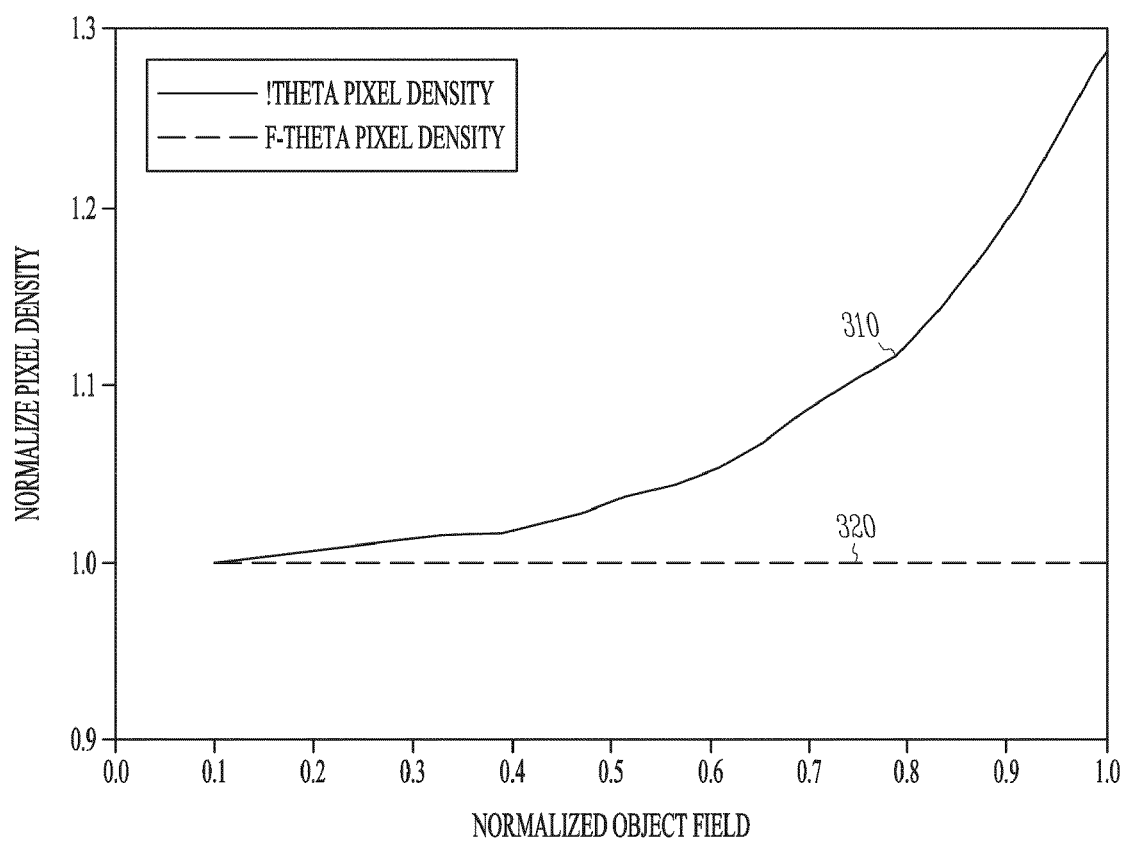
FIG. 3 is a plot of a projected radial pixel density of a !theta lens and an f-θ lens normalized to the on axis density according to various embodiments.

FIG. 3 is a plot of a projected radial pixel density of a !theta lens 310 and an f-θ lens 320 normalized to the on axis density according to various embodiments. The radial pixel density for the !theta lens 310 is about 1.3 times more dense at the full field than it is on axis. For planetarium domes such as the dome theater 100 shown in FIG. 1 the full field and on axis points correspond to the event horizon 184 and the zenith 190, respectively.

Figure 4:
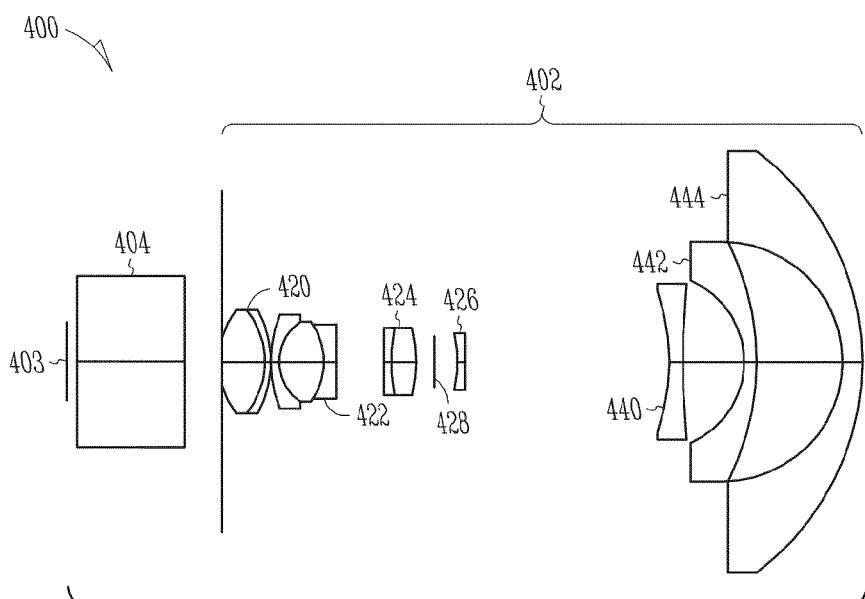
FIG. 4 is a sectional view of a !theta lens and a light engine according to various embodiments.

FIG. 4 is a sectional view of a system 400 including a !theta lens 402, a source image 403, and a light engine 404 according to various embodiments. FIG. 2 described above illustrates specific field points projected from the !theta lens 402 and the light engine 404 shown in FIG. 4.

The light engine 404 includes a light source, condenser, and integrating optics, and any image source intended for projection such as film, liquid crystal array or digital micromirror array. Other types of light engines can be used as the light engine 404 according to various embodiments, including light engines not yet developed.

The !theta lens 402 includes three lens groups. A first lens group includes two lenses 420 and 422 that nearly collimate light leaving the light engine 404. A second lens group includes two lenses 424 and 426 that perform wavefront shaping near a stop aperture 428. A third lens group, called a meniscus lens group, includes three meniscus lenses 440, 442, and 444 that project light rays over a wide field of view. The meniscus lens group has an overall negative power that is divided among the three meniscus lenses 440, 442, and 444. For modest departures from an f-θ distribution the three meniscus lenses 440, 442, and 444 may all be built with spherical curvatures. For more radical departures, such as ≧50% pixel density variation, one or more of the three meniscus lenses 440, 442, and 444 in the meniscus lens group may have an aspheric surface.

According to various embodiments, none of the lenses 420-444 shown in FIG. 4 has an aspheric surface. According to various embodiments, only one of the surfaces of the lenses 420-444 shown in FIG. 4 is an aspheric surface. According to various embodiments, more than one of the surfaces of the lenses 420-444 shown in FIG. 4 is an aspheric surface. A specific lens design of the lenses in the !theta lens 402 will depend in part on the characteristics of the light engine 404.

The plot of projected radial pixel density shown in FIG. 3 is produced by the !theta lens 402 and the light engine 404 shown in FIG. 4.

Figure 5:
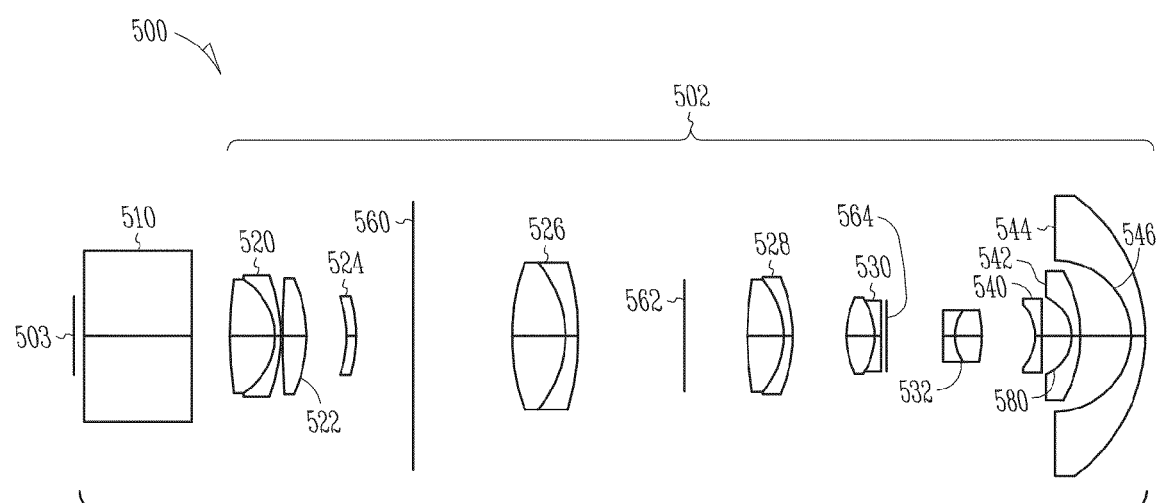
FIG. 5 is a sectional view of a !theta lens and a light engine according to various embodiments.

FIG. 5 is a sectional view of a system 500 including a !theta lens 502, a source image 503, and a light engine 510 according to various embodiments.

The light engine 510 includes a light source, condenser, and integrating optics, and any image source intended for projection such as film, liquid crystal array or digital micromirror array. Other types of light engines can be used as the light engine 510 according to various embodiments, including light engines not yet developed.

The !theta lens 502 includes two lens groups. A relay lens group includes five lenses 520, 522, 524, 526, and 528. A wide angle lens group includes five lenses 530, 532, 540, 542, and 544 that project light rays over a wide field of view. A reference surface 560 is located between the lenses 524 and 526. The lenses 540, 542, and 544 are meniscus lenses. The lens 544 has a concave surface 546 that is aspheric. The relay lens group serves to re-image the source image 503 to an intermediate image plane 562 closer to an end of the !theta lens 502. This allows the wide angle lens group to be located close to the second image plane 562. The aspheric concave surface 546 of the lens 544 helps to achieve the pixel distribution of the !theta lens 502 while maintaining the demanding image quality requirements of high resolution projectors. A stop aperture 564 is located between the lenses 530 and 532.

In an alternative embodiment, the lens 544 is not aspheric, and the concave surface 580 of the lens 542 is aspheric instead. In an alternative embodiment, distortion is introduced into the relay lens group while none of the lenses in the wide angle lens group is aspheric. According to various embodiments, none of the lenses 520-544 shown in FIG. 5 has an aspheric surface.

According to various embodiments, only one of the surfaces of the lenses 520-544 shown in FIG. 5 is an aspheric surface. According to various embodiments, more than one of the surfaces of the lenses 520-544 shown in FIG. 5 is an aspheric surface. A specific lens design of the lenses in the !theta lens 502 will depend in part on the characteristics of the light engine 510.

Figure 6:
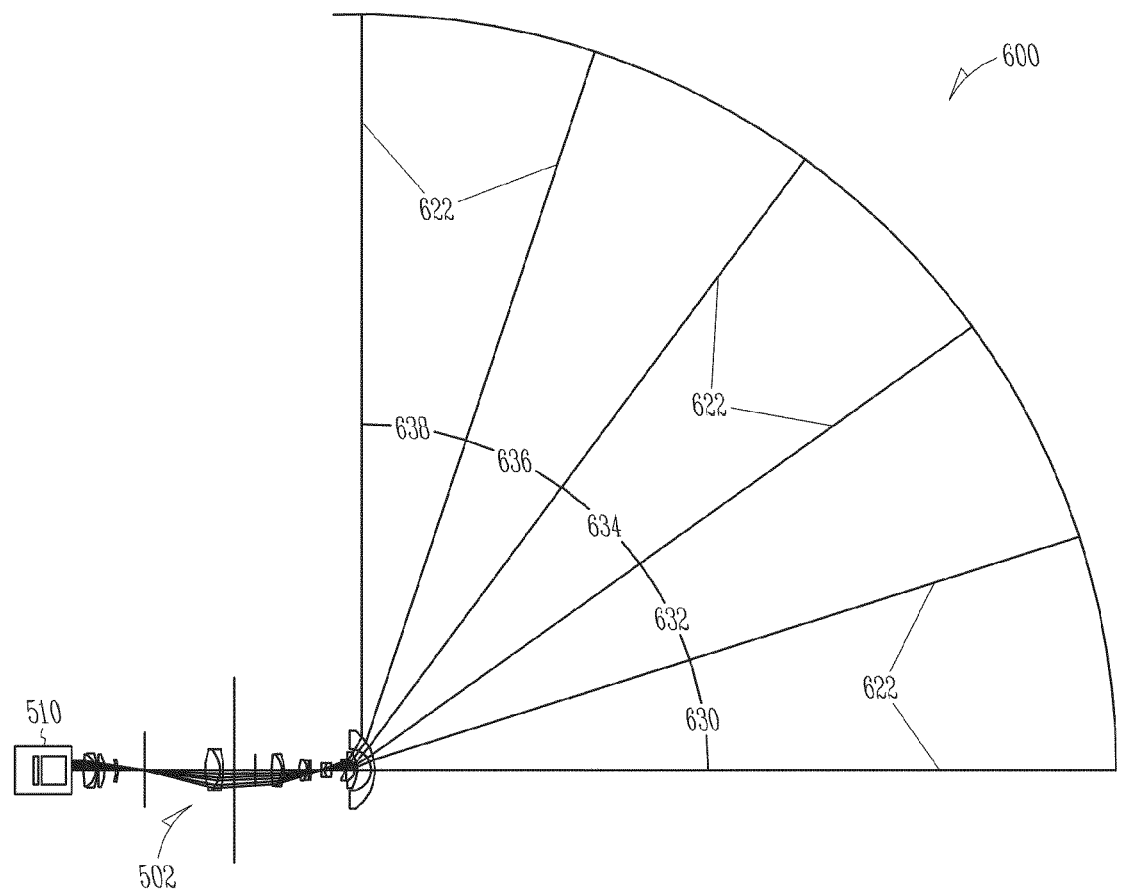
FIG. 6 illustrates specific field points projected from the !theta lens and the light engine shown in FIG. 5 with an unequal angular distribution according to various embodiments.

FIG. 6 illustrates specific field points 600 projected from the !theta lens 502 and the light engine 510 shown in FIG. 5 with an unequal angular distribution according to various embodiments. Six ray bundles 622 represent light projected from the !theta lens 502 and the light engine 510. Angles 630-638 between the bundles 622 gradually decrease. The angle 630 is greater than the angle 632, which in turn is greater than the angle 634, and so on. This distribution is represented mathematically as the angles 630>632>634>636>638.

Figure 7:
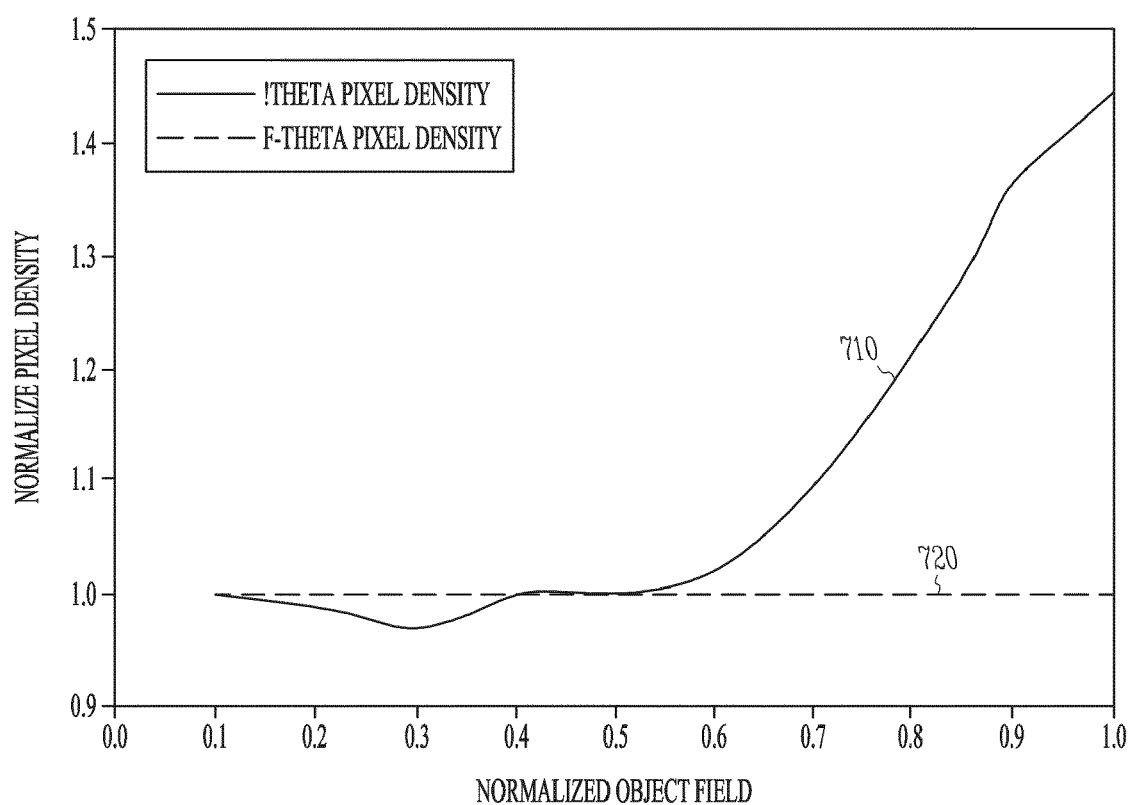
FIG. 7 is a plot of a projected radial pixel density of a !theta lens and an f-θ lens normalized to the on axis density according to various embodiments.

FIG. 7 is a plot of a projected radial pixel density of a !theta lens 710 and an f-θ lens 720 normalized to the on axis density for the !theta lens and the light engine shown in FIG. 5 according to various embodiments. The total departure from an equal angular pixel distribution is 1.45 meaning that the pixel density is 45% higher at the full field than it is in an equal angular pixel distribution. It should be noted that there is a slight dip in the pixel density curve around the 0.3 field point. This means that the lowest narrow field pixel density is not actually on-axis but at the 0.3 field.

Figure 8:
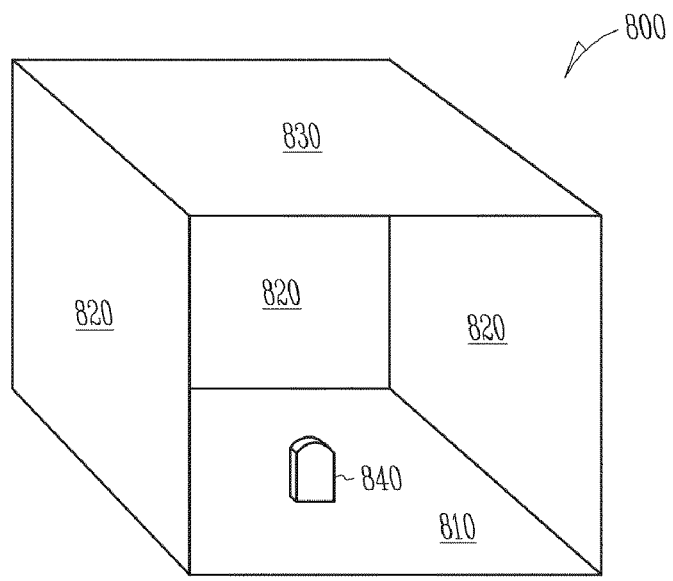
FIG. 8 illustrates a three-dimensional rectangular room including a projection system according to various embodiments.

Projection systems according to various embodiments described herein are capable of projecting images or arrays of pixels onto a surface that is not a truncated sphere. FIG. 8 illustrates a three-dimensional rectangular room 800 including a projection system according to various embodiments. The room 800 has six interior planar surfaces or planes including a floor 810, four walls 820 (three being shown), and a ceiling 830. A projection system 840 according to various embodiments is located on the floor 810. The projection system 840 includes a !theta lens and a light engine to project images or arrays of pixels onto the interior planar surfaces such as the walls 820 and the ceiling 830 of the room 800. According to various embodiments, there are two or more projection systems 840 in the room 800 (only one being shown) to project images or arrays of pixels onto the interior planar surfaces such as the walls 820 and the ceiling 830 of the room 800. According to various embodiments, there are one or more projection systems 840 attached to one or more of the floor 810, the walls 820, and/or the ceiling 830 to project images or arrays of pixels onto other planes of the room 800.

Figure 9:
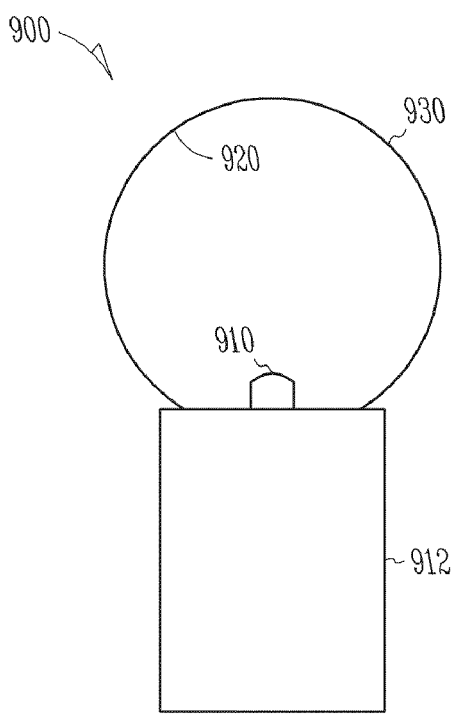
FIG. 9 illustrates a globe kiosk including a projection system according to various embodiments.

FIG. 9 illustrates a globe kiosk 900 including a projection system 910 according to various embodiments. The projection system 910 sits on a base 912. The projection system 910 includes a !theta lens and a light engine to project images or arrays of pixels onto an interior surface 920 of a truncated globe 930. The projection system 910 projects from inside the surface 920, and the resulting image is viewed from outside the surface 920. The truncated globe 930 is a truncated sphere having a sweep angle of greater than 135 degrees. According to various embodiments, the projection system 910 projects onto a truncated sphere having a sweep of less than 180 degrees, a sweep of approximately 180 degrees, or a sweep of greater than 180 degrees. According to various embodiments, the projection system 910 projects from inside a truncated sphere that is mounted on a flat surface such as a floor, a wall, or a ceiling of a room, and the resulting image is viewed from outside the truncated sphere.

Table 1 below lists specific designs for surfaces of the lenses of the !theta lens 402 shown in FIG. 4 according to various embodiments. The surfaces are numbered in order as they appear from left to right in FIG. 4.

TABLE 1

| Element | # | Type | Radius | Thickness | Glass | Semi-Diameter |
|---|---|---|---|---|---|---|
| 420 | 10 | STANDARD | 24.53 | 9.94 | S-FPL51 | 12.00 |
| | 11 | STANDARD | −19.16 | 1.40 | S-LAH51 | 12.12 |
| | 12 | STANDARD | −28.57 | 0.50 | | 12.30 |
| 422 | 13 | STANDARD | 37.71 | 1.40 | S-TIM22 | 10.84 |
| | 14 | STANDARD | 11.38 | 10.50 | S-FPL51 | 9.40 |
| | 15 | STANDARD | −15.09 | 2.50 | S-TIH6 | 8.84 |
| | 16 | STANDARD | −145.72 | 11.65 | | 8.75 |
| 424 | 17 | STANDARD | 1000 | 1.72 | S-LAL8 | 7.85 |
| | 18 | STANDARD | 37.55 | 5.68 | SFL6 | 7.73 |
| | 19 | STANDARD | −30.05 | 3.40 | | 7.51 |
| 428 | 20 | STANDARD | inf | 5.41 | | 5.96 |
| 426 | 21 | STANDARD | −24.04 | 1.94 | S-FPL51 | 6.26 |
| | 22 | STANDARD | −75.03 | 63.14 | | 6.61 |
| 440 | 23 | STANDARD | −53.76 | 3.47 | S-LAL61 | 16.90 |
| | 24 | STANDARD | 317.37 | 14.62 | | 18.50 |
| 442 | 25 | STANDARD | −20.34 | 2.60 | S-LAL8 | 19.00 |
| | 26 | STANDARD | −64.24 | 20.00 | | 28.33 |
| 444 | 27 | STANDARD | −28.69 | 4.60 | S-TIH6 | 28.60 |
| | 28 | STANDARD | −62.24 | 35.00 | | 49.40 |

Table 2 below lists specific designs for surfaces of the lenses of the !theta lens 502 shown in FIG. 5 according to various embodiments. The surfaces are numbered in order as they appear from left to right in FIG. 5.

TABLE 2

| Element | # | Type | Radius | Thickness | Glass | Semi-Diameter |
|---|---|---|---|---|---|---|
| 520 | 10 | STANDARD | 165.27 | 15.00 | S-PHM53 | 19.04 |
| | 11 | STANDARD | −23.67 | 2.50 | S-TIM35 | 19.32 |
| | 12 | STANDARD | −53.12 | 0.70 | | 20.51 |
| 522 | 13 | STANDARD | 373.14 | 8.00 | S-PHM53 | 20.27 |
| | 14 | STANDARD | −47.63 | 14.00 | | 20.12 |
| 524 | 15 | STANDARD | −31.07 | 3.00 | S-TIH53 | 13.29 |
| | 16 | STANDARD | −45.43 | 20.00 | | 13.42 |
| 560 | 17 | STANDARD | inf | 94.22 | | 9.41 |
| 526 | 18 | STANDARD | 67.40 | 18.00 | S-BSM16 | 24.80 |
| | 19 | STANDARD | −38.32 | 4.00 | S-TIH6 | 24.56 |
| | 20 | STANDARD | −105.10 | 52.25 | | 25.05 |
| 562 | 21 | STANDARD | inf | 15.00 | | 18.88 |
| 528 | 22 | STANDARD | 119.10 | 12.50 | S-BSM16 | 19.49 |
| | 23 | STANDARD | −28.75 | 3.00 | S-TIH53 | 19.35 |
| | 24 | STANDARD | −48.00 | 20.00 | | 19.79 |
| 530 | 25 | STANDARD | 27.54 | 10.00 | S-PHM53 | 12.74 |
| | 26 | STANDARD | −19.63 | 2.00 | S-TIH53 | 11.74 |
| | 27 | STANDARD | 339.46 | 14.43 | | 10.93 |
| 564 | 28 | STANDARD | inf | 3.95 | | 4.49 |
| 532 | 29 | STANDARD | 58.02 | 4.70 | S-BSM16 | 6.93 |
| | 30 | STANDARD | 16.20 | 8.60 | S-TIH53 | 8.41 |
| | 31 | STANDARD | −60.06 | 18.00 | | 9.02 |
| 540 | 32 | STANDARD | −13.92 | 2.50 | S-PHM53 | 10.10 |
| | 33 | STANDARD | −236.51 | 9.83 | | 12.69 |
| 542 | 34 | STANDARD | −14.32 | 2.50 | S-TIH53 | 13.36 |
| | 35 | STANDARD | −48.81 | 17.40 | | 21.51 |
| 544 | 36 | EVENASPH | −28.21 | 5.00 | PMMA | 26.30 |
| | 37 | STANDARD | −58.88 | 25.00 | | 48.00 |

Surface 36: Even Asphere sag expression $$z = \frac{cr^2}{1 + \sqrt{1 - (1+k)c^2r^2}} + \alpha_1 r^2 + \alpha_2 r^4 + \alpha_3 r^6 + \alpha_4 r^8 + \alpha_5 r^{10}$$

| $a_1$ | $a_2$ | $a_3$ | $a_4$ | $a_5$ |
|---|---|---|---|---|
| 0 | −1.16E−05 | 2.94E−08 | −3.97E−11 | −1.66E−14 |

In both Table 1 and Table 2 above, the reference number identifying the element in the Figure is listed in the column entitled "Element." The surfaces of the elements are numbered in the column entitled "#." The specifications for each surface are listed in the remaining columns, and each row lists the specification for a single surface.

Various embodiments described herein improve the projected pixel distribution for dome theaters, kiosks, and other surfaces. Some embodiments include an aspheric optical element in a fisheye lens design. In the case of the dome theater 100 illustrated in FIG. 1, the center of focus is near the event horizon 184 with less attention paid to the zenith 190 of the dome 130. Various embodiments create a greater pixel density at the event horizon 184 than at the zenith 190.

According to various embodiments, a light engine includes a light source, a condenser, and integrating optics, and a source image selected from the group consisting of film, a transmissive or reflective liquid crystal array, a digital micromirror array, a light emitting diode (LED) array, and an organic light emitting diode (OLED) array.

According to various embodiments, projection system such as one of the projection systems described herein projects from inside a surface and the resulting image is viewed from both inside the surface and outside the surface.

According to various embodiments, two or three or more projection systems of the type of the projection systems described herein may be used to project images in a bounded space such as the room 800 shown in FIG. 8.

According to various embodiments, projection system such as one of the projection systems described herein projects from inside a surface that has the geometry of a truncated sphere or a three-dimensional rectangular room or a truncated icosahedron or any other geometry.

A lens according to various embodiments provides a projected field of view of 135 degrees or more with a non-linear image distortion characteristic that departs from the normal linear, or f-θ, distortion of an f-θ fisheye lens. In particular, an f-θ fisheye lens will produce an equal angular pixel distribution. The lens systems of various embodiments described herein will, by contrast, produce a higher angular pixel density at the edge of a field than at a center of the field as is shown in FIG. 3. This is advantageous in, for example, a dome theater application where the focus of attention is near the event horizon, such as the event horizon 184 shown in FIG. 1. Various embodiments described herein are also advantageous in projection onto truncated spheres where the angular sweep of the dome is less than 180 degrees.

Some lens systems of various embodiments described herein were described as having one or more aspheric surfaces. An aspheric surface in one or more of the various embodiments described herein can be a diffractive optical element.

The lenses of various embodiments described herein are fabricated from a material such as glass or plastic. The lens systems of various embodiments described herein may include only glass lenses, only plastic lenses, or a combination of glass lenses and plastic lenses. Lens systems according to various embodiments include optical elements other than lenses such as one or more diffractive optical elements, mirrors, or other optical elements not yet developed.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" may be used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A method comprising:
   projecting pixels through a plurality of lenses in to a field having a sweep angle of greater than 135 degrees with an angular pixel density that is greater than or equal to about 1.3 times more dense at an edge of the field than an angular pixel density at a center of the field.

2. The method of claim 1 wherein projecting pixels through a plurality of lenses further comprises projecting pixels through the plurality of lenses in to the field having a sweep angle of greater than 135 degrees with an angular pixel density at an edge of the field that is about 1.45 times more dense than an angular pixel density at a center of the field.

3. The method of claim 1 wherein projecting pixels through a plurality of lenses further comprises projecting pixels through the plurality of lenses in to the field having a sweep angle of greater than 135 degrees with an angular pixel density at a location between a center of the field and an edge of the field that is greater than or equal to about 1.12 times more dense than an angular pixel density at the center of the field, the location being about eighty percent of a distance from the center of the field to the edge of the field.

4. The method of claim 1, further comprising:
   generating the pixels in a light engine; and
   receiving the pixels from the light engine in the plurality of lenses.

5. The method of claim 1 wherein projecting pixels through a plurality of lenses further comprises projecting the pixels through an aspheric surface.

6. The method of claim 1 wherein projecting pixels through a plurality of lenses further comprises projecting the pixels through a plurality of aspheric surfaces.

7. An apparatus comprising:
   a light engine to generate pixels; and
   a plurality of lenses positioned to receive pixels from the light engine and to project the pixels in to a field having a sweep angle of greater than 135 degrees with an angular pixel density that is greater than or equal to about 1.3 times more dense at an edge of the field than an angular pixel density at a center of the field.

8. The apparatus of claim 7 wherein the plurality of lenses are positioned to project the pixels in to the field having a sweep angle of greater than 135 degrees with an angular pixel density that is about 1.45 times more dense at an edge of the field than an angular pixel density at a center of the field.

9. The apparatus of claim 7 wherein the plurality of lenses are positioned to project the pixels in to the field having a sweep angle of greater than 135 degrees with an angular pixel density at a location between a center of the field and an edge of the field that is greater than or equal to about 1.12 times more dense than an angular pixel density at the center of the field, the location being about eighty percent of a distance from the center of the field to the edge of the field.

10. The apparatus of claim 7 wherein the plurality of lenses comprise a plurality of meniscus lenses.

11. The apparatus of claim 7 wherein the plurality of lenses comprise:
a plurality of spherical surfaces; and
an aspheric surface.

12. The apparatus of claim 11 wherein the aspheric surface comprises a diffractive optical element.

13. A system comprising:
a surface; and
a projection system to project an image onto the surface, the projection system including:
a light engine to generate pixels; and
a plurality of lenses positioned to receive pixels from the light engine and to project the pixels over a field of view greater than 135 degrees having an angular pixel density that is greater than or equal to about 1.3 times more dense at an edge of the field of view than an angular pixel density at a center of the field of view on to the surface.

14. The system of claim 13 wherein the surface comprises a truncated spherical surface truncated by two planes.

15. The system of claim 13 wherein the surface has a sweep angle of less than 180 degrees.

16. The system of claim 13 wherein the projection system is located a distance from a geometric center of the surface.

17. The system of claim 13 wherein the plurality of lenses are positioned to project the pixels over the field of view greater than 135 degrees having an angular pixel density that is about 1.45 times more dense at an edge of the field of view than an angular pixel density at a center of the field of view.

18. The system of claim 13, further comprising a sound system with speakers to project voice and music into a space under the surface.

19. The system of claim 13 wherein the plurality of lenses are positioned to project the pixels over the field of view greater than 135 degrees having an angular pixel density at a location between a center of the field of view and an edge of the field of view that is about 1.21 times more dense than an angular pixel density at the center of the field of view, the location being about eighty percent of a distance from the center of the field of view to the edge of the field of view.

20. The method of claim 1 wherein projecting the pixels through the plurality of lenses further comprises projecting the pixels through a plurality of spherical surfaces.

* * * * *